2,850,797
METHOD OF ASSEMBLING BUTYL RUBBER "O" RINGS IN A HYDRAULIC SYSTEM

Carl W. Chambers and Douglas H. Moreton, Pacific Palisades, Calif., assignors to Douglas Aircraft Company, Inc., Santa Monica, Calif.

No Drawing. Application March 2, 1956
Serial No. 568,959

10 Claims. (Cl. 29—450)

This invention relates to a method of assembling the parts of a hydraulic system for use with a phosphate ester base hydraulic fluid in which butyl rubber O rings are assembled in a piston unit and in which there is applied to the parts during assembly a lubricating composition in the nature of a grease made essentially of a phosphate ester component, organophilic bentonite, and molybdenum disulfide.

In hydraulic systems using certain phosphate ester base hydraulic fluids the sealing means, such as the O rings or seals of other shapes, are made of an elastomer which is not attacked or swelled by the phosphate ester, for example, butyl rubber. Such elastomeric material, however, is attacked and badly swelled by the usual petroleum hydrocarbons used in the petroleum hydrocarbon base greases and, accordingly, such greases cannot be used in contact with such elastomeric materials as butyl rubber. It is necessary, however, to use a grease-like lubricant in assembling a hydraulic system piston unit with butyl rubber O ring seals and the customary back-up ring and butyl rubber accumulator diaphragm for a hydraulic system, especially because of the relative low nicking or cutting resistance of the butyl rubber O rings and diaphragm. Since ordinary petroleum base greases cannot be used for this purpose without deleterious effect on the butyl rubber parts, no satisfactory grease-like composition has heretofore been available for this purpose.

In accordance with the discovery of our invention, it is now possible to assemble these parts with a grease-like material which will not only be harmless to such butyl rubber parts but which also provides a surprisingly satisfactory grease-like lubricant for this purpose made of a new combination of at least three ingredients; namely, a phosphate ester component compatible with the butyl rubber, organophilic bentonite gelling agent, and molybdenum disulfide, which are surprisingly compatible, and co-act in the composition to produce new and unexpected results in the method of this invention. Such compositions can be made in surprisingly simple and inexpensive manner. To illustrate the simplicity of making the grease-like composition for use in our invention, such a composition can be made by using some of the phosphate ester base hydraulic fluid itself and simply mixing the phosphate ester base hydraulic fluid, the molybdenum disulfide and organophilic bentonite in a colloid mill, and the relative proportion of organophilic bentonite gelling agent can be adjusted to give the desired consistency as measured by penetration in accordance with well-known procedures for making a grease.

In accordance with one embodiment of the invention, we make a grease-like composition for use in assembling the butyl rubber O ring seals in the hydraulic system to be used with a phosphate ester base hydraulic fluid composed, for example, of 47.5 volume percent of 2-ethyl-hexyl diphenyl phosphate, 47.5 percent of iso-octyl diphenyl phosphate, and 5 percent of a solution of polyoctyl methacrylate having an average molecular weight of about 8,500 and a molecular weight range of from about 2,000 to 14,000 dissolved in 45% by volume of a light petroleum oil of 200° F. flash point.

Example I

This composition is made by mixing the following three ingredients:

15 weight percent of finely powdered molybdenum disulfide
20 weight percent of Bentone 34 organophilic bentonite
65 weight percent of:
    47.5% 2-ethylhexyl diphenyl phosphate
    47.5% iso-octyl diphenyl phosphate
    5% of a solution of polyoctyl methacrylate having an average molecular weight of about 8,500 and a molecular weight range of from about 2,000 to 14,000 dissolved in 45% by volume of a light petroleum oil of 200° F. flash point.

All the indicated $MoS_2$ hydraulic fluid and somewhat less than the indicated amount of Bentone 34 organophilic bentonite were repeatedly mixed in a colloid mill and the rest of the bentonite was gradually added during mixing until the penetration reached the desired value of 294, by ASTM D 217–48. It will be understood that the desired consistency of the product can easily be controlled by the amount of bentonite gelling agent added.

Bentone 34 is the trademark designation of a particular organophilic bentonite obtained on the market from National Lead Company. In the example above this organophilic bentonite is a reaction product of the Wyoming type bentonite or montmorillonite, in which the base exchangeable cation is predominantly sodium, by base exchanging sodium cation with dimethyl dialkyl quaternary ammonium chloride having the two alkyl chains of about 16 carbon atoms each to give a completely hydropholic and organophilic bentonite. In making this product, the bentonite is first purified to remove non-clay particles, particularly quartz which would be abrasive. The reactive sodium ions of this montmorillonite are then fully replaced by the organic cations, and the product washed, filtered and dried.

The grease-like composition of this Example I is very simply made. In accordance with the invention it is used for lubricating O rings or other butyl packings when assembling hydraulic system components, without harm to them, and is surprisingly better lubricant for this purpose than known greases used for other elastomeric materials in petroleum systems, even though the butyl rubber O ring has a much lower nicking and cutting resistance than the Buna N ring used in petroleum systems. The components of this composition are surprisingly compatible, the composition can be handled, packaged and used as a grease, even over a wide temperature range and under various other conditions of use.

The following is a further particular example illustrating the invention:

Example II

The butyl rubber O rings and butyl rubber accumulator diaphragm of a hydraulic system were assembled by applying thereto a grease-like composition as follows:

65 weight percent dibutyl phenyl phosphate
20 weight percent Bentone 34 organophilic bentonite
15 weight percent of finely powdered molybdenum disulfide.

All the indicated $MoS_2$, dibutyl phenyl phosphate, and somewhat less than the indicated amount of organophilic bentonite were repeatedly mixed in a colloid mill and the rest of the bentonite was gradually added during mixing until the penetration reached the desired value of 294, by ASTM D 217–48.

It will be understood that other phosphate ester base fluids may be used and phosphate esters themselves for making grease-like compositions for the method of this invention. In general, any phosphate ester suitable as a lubricant or hydraulic fluid and lubricant not harmful to butyl rubber can be used as represented by the following formula:

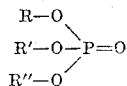

in which R is a radical of the group consisting of an alkyl radical having from 4 to 8 carbon atoms, cresyl and xylyl, R' is a radical of the group consisting of an alkyl radical having from 4 to 6 carbon atoms, phenyl, cresyl and xylyl and R'' is a radical of the group consisting of an alkyl radical having from 4 to 6 carbon atoms, phenyl, cresyl and xylyl, and in which, when R is alkyl with more than 6 carbon atoms, R' and R'' are both aryl. To illustrate, such phosphate esters include the following:

| | |
|---|---|
| tri-n-butyl | tri-cresyl |
| tri-isobutyl | tri-xylyl |
| tri-pentyl | phenyl dicresyl |
| tri-hexyl | cresyl diphenyl |
| dibutyl phenyl | xylyl diphenyl |
| dihexyl phenyl | butyl diphenyl |
| hexyl diphenyl | iso-octyl diphenyl |
| octyl diphenyl | 2-ethyl hexyl diphenyl |

It will be understood, however, that although other phosphate esters may be used for making grease-like compositions in accordance with my invention, if the composition is to be used without harm to butyl rubber packings, the phosphate ester must be one which will not attack or swell butyl rubber as known in the art. It is a discovery in accordance with this invention that my compositions can be made with phosphate esters which do not so attack butyl rubber.

Any of the organophilic bentonites having alkyl radicals in place of the sodium cation may be used which are sufficiently organophilic to make a grease-like composition with the particular phosphate ester or phosphate ester containing fluid. For this purpose the organic cations must make the bentonite into which they are introduced sufficiently organophilic and hydrophobic to form a gel with the phosphate ester component. In general for this purpose, with the use of a quaternary alkyl ammonium salt, the alkyl groups will have from about 26 to 40 carbon atoms to make the corresponding quaternary alkyl ammonium bentonite.

Although the essential novelty of the invention resides in the discovery with respect to the three components described and any relative proportions may be used which give a grease-like composition of the desired properties for use, usually the phosphate ester component will be from about 70 to 90 percent and the organophilic bentonite from about 30 to 10 percent with from about 1 to 30 percent of the molybdenum disulfide based on the weight of the phosphate ester component and organophilic bentonite together taken as 100 percent.

It will be understood that the specific examples given above are for the purpose of illustrating the invention and the invention includes other modifications within the scope of the following claims.

This application is a continuation-in-part of our co-pending application Serial No. 295,355, filed June 24, 1952, now abandoned.

We claim:
1. In the method of assembling the parts of a hydraulic system for use with a phosphate ester base hydraulic fluid in which butyl rubber O rings are assembled in a piston unit and a lubricant is applied to the parts during assembly, the improvement for assembling butyl rubber O rings in such a piston unit which comprises applying to said butyl rubber O rings a grease-like composition consisting of a phosphate ester component compatible with said butyl rubber, an organophilic bentonite forming a gel with said phosphate ester component, and molybdenum disulfide.

2. The method as defined in claim 1 in which said composition consists of a phosphate ester liquid lubricant component, organophilic bentonite capable of forming a gel with said phosphate ester component, and a sufficient proportion thereof to thicken the composition to grease consistency, and from about 1 to 30 percent of molybdenum disulfide.

3. The method as defined in claim 1 in which said composition consists of about 70 to 90 percent of phosphate ester, a sufficient proportion of about 30 to 10 percent of organophilic bentonite to thicken the composition to grease consistency, and from about 1 to 30 percent of molybdenum disulfide based on the combined weight of phosphate ester and bentonite.

4. The method as defined in claim 1 in which said composition consists of the following ingredients in substantially the following proportions by weight:

20 percent of organophilic bentonite
15 percent of molybdenum disulfide
60 percent of mixture of 2-ethylhexyl and iso-octyl diphenyl phosphates in equal proportion containing about 5 percent of polyoctyl methacrylate.

5. The method as defined in claim 3 in which said phosphate ester is 2-ethylhexyl diphenyl phosphate.

6. The method as defined in claim 3 in which said phosphate ester is iso-octyl diphenyl phosphate.

7. The method as defined in claim 3 in which said phosphate is dibutyl phenyl phosphate.

8. The method as defined in claim 3 in which said phosphate ester is tricresyl phosphate.

9. The method as defined in claim 3 in which said phosphate ester is represented by the formula

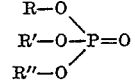

in which R is a radical of the group consisting of an alkyl radical having from 4 to 8 carbon atoms, cresyl and xylyl, R' is a radical of the group consisting of an alkyl radical having from 4 to 6 carbon atoms, phenyl, cresyl and xylyl, and R'' is a radical of the group consisting of an alkyl radical having from 4 to 6 carbon atoms, phenyl, cresyl and xylyl, and in which, when R is alkyl with more than 6 carbon atoms, R' and R'' are both aryl.

10. The method as defined in claim 9 in which said phosphate ester is alkyl aryl phosphate.

References Cited in the file of this patent

UNITED STATES PATENTS

| | | |
|---|---|---|
| 1,803,491 | Thiry | May 5, 1931 |
| 2,156,803 | Cooper | May 3, 1939 |
| 2,245,649 | Caprio | June 17, 1941 |
| 2,531,440 | Jordan | Nov. 28, 1950 |
| 2,572,215 | Swart | Oct. 23, 1951 |